(12) United States Patent
Murai

(10) Patent No.: US 6,955,476 B1
(45) Date of Patent: Oct. 18, 2005

(54) RETAINER FOR ROLLING BEARINGS

(75) Inventor: Takashi Murai, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/559,820

(22) Filed: Apr. 28, 2000

(30) Foreign Application Priority Data

Apr. 28, 1999 (JP) .............................. P. 11-123015
Mar. 31, 2000 (JP) ......................... P. 2000-099171

(51) Int. Cl.⁷ ............................................ F16C 33/46
(52) U.S. Cl. ..................................... 384/580; 384/572
(58) Field of Search .............................. 384/572, 576, 384/580; 29/898.065, 898.067; 409/131, 409/132

(56) References Cited

U.S. PATENT DOCUMENTS

| | | | |
|---|---|---|---|
| 2,327,237 A | | 8/1943 | Baden ........................ 29/148.4 |
| 2,890,627 A | * | 6/1959 | Onksen et al. .............. 409/132 |
| 4,054,340 A | | 10/1977 | Broshkevitch et al. ...... 308/217 |
| 4,744,679 A | * | 5/1988 | Verburg et al. ............. 384/523 |
| 4,942,652 A | * | 7/1990 | Hazebrook et al. .... 29/898.067 |
| 6,132,102 A | * | 10/2000 | Bessone et al. ............. 384/576 |

FOREIGN PATENT DOCUMENTS

| | | | | |
|---|---|---|---|---|
| AT | 373539 | 1/1984 | ........... | B29F 1/022 |
| DE | 1007571 | 11/1957 | ........... | F06C 47/12 |
| DE | 1062069 | 1/1966 | ........... | F06C 47/12 |
| DE | 1398792 | 10/1972 | ........... | F16C 33/46 |
| DE | 3327623 C2 | 9/1987 | ........... | F16C 33/46 |
| DE | 4034517 A1 | 5/1991 | ........... | F16C 33/49 |
| DE | 42 18 609 A1 | 12/1993 | ........... | F16C 33/46 |
| DE | 19843631 A1 | 4/1999 | ........... | F16C 33/46 |
| JP | 6-159370 | 6/1994 | ........... | F16C 33/46 |
| JP | 11-218135 | 8/1999 | ........... | F16C 33/46 |

* cited by examiner

*Primary Examiner*—Thomas R. Hannon
(74) *Attorney, Agent, or Firm*—Sughrue Mion, PLLC

(57) ABSTRACT

In machining a pocket (1) installing therein a rolling element, tools (7, 8) are prepared whose milling parts (5, 8a) have contours which coincide with the sectional configuration of the pocket resulting when the pocket has been machined along a retainer radial direction (Z), and the milling parts (5, 8a) of the tools (7, 8) are inserted into a prepared hole for the pocket which is provided in advance and are then translated in a retainer revolving direction (Y) and axial direction (X), respectively, for forming the pocket. Accordingly, it is possible to provide a retainer for rolling bearings that has high accuracy in machining pockets and which is suitable for an integral one-piece retainer.

12 Claims, 11 Drawing Sheets

FIG.3
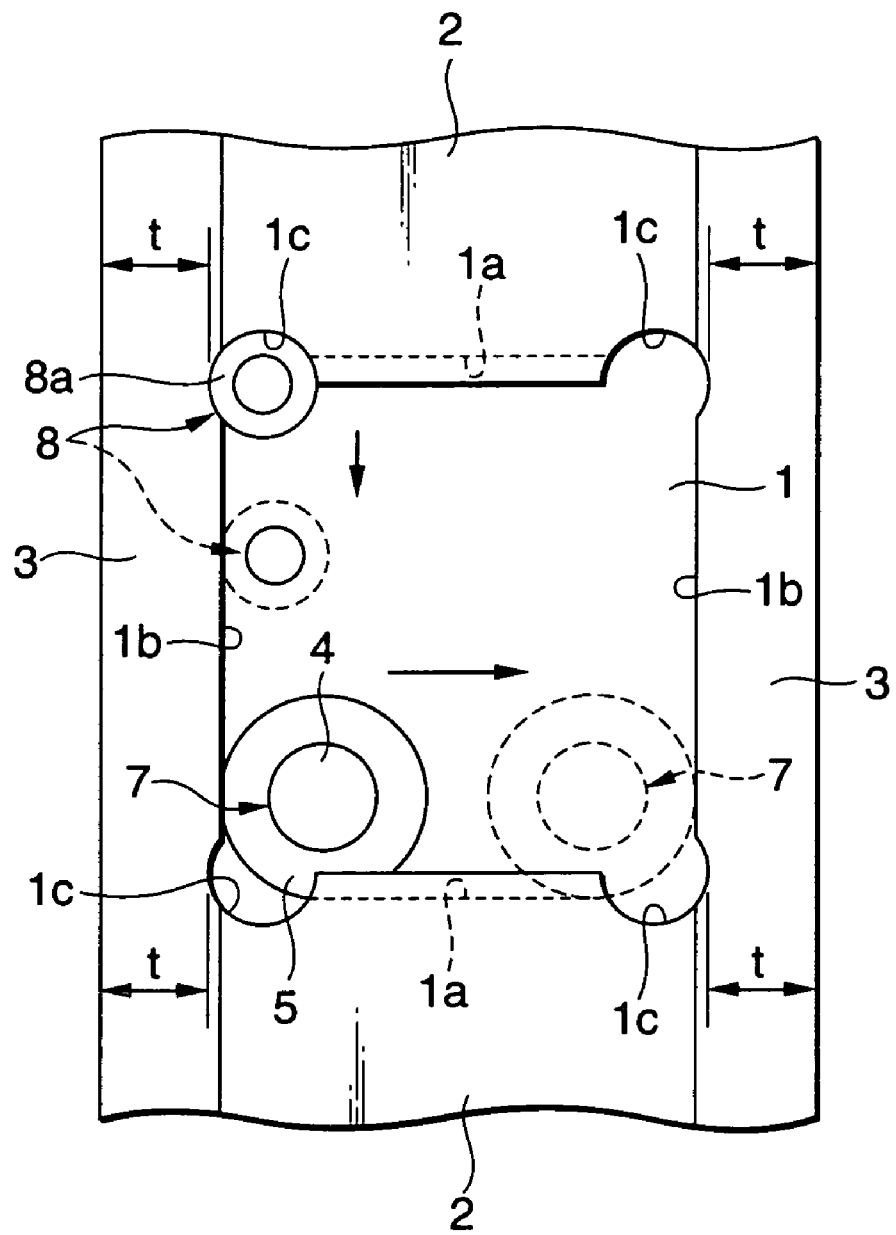
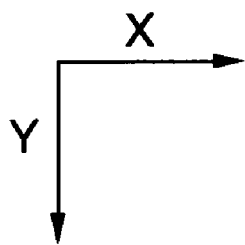

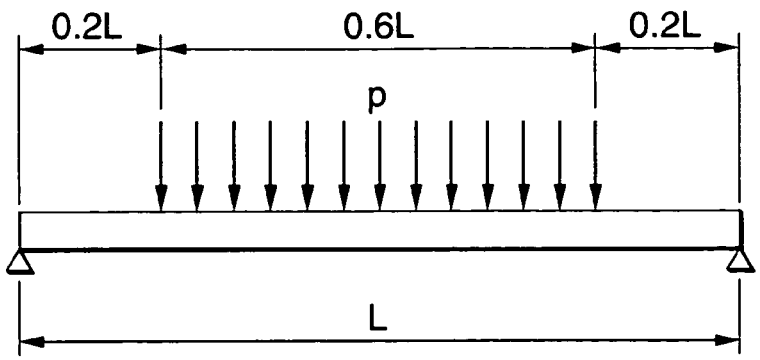
FIG.5A
FIG.5B
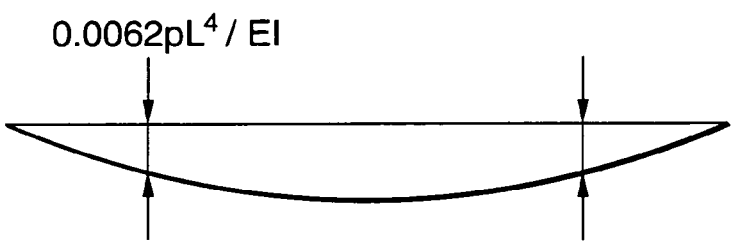
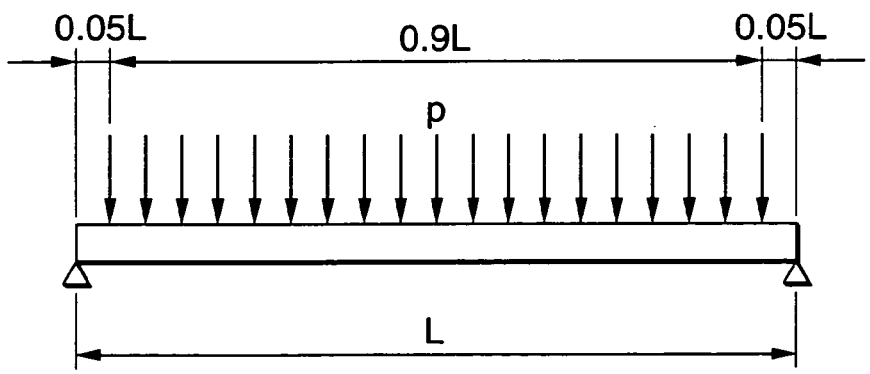
FIG.5C
FIG.5D

RETAINER FOR ROLLING BEARINGS

BACKGROUND OF THE INVENTION

1. Field of the Invention

The present invention relates to a retainer adapted to be installed in a rolling bearing, in particular, a roller bearing for use in iron and steel making equipment, construction equipment, railway cars as well as general industrial machinery.

2. Description of the Related Art

A machined retainer is known as a retainer adapted to be installed in a rolling bearing for use in general industrial machinery and which is of high accuracy, and a metallic split-type machined retainer is common as a machined retainer for roller bearings.

As shown in FIG. 14, this split-type machined retainer comprises two components 52, 53 which are a pocket forming component 52 comprising in turn a plurality of pillars 50 arranged in a revolving direction of the retainer and a side plate 51, and a flange component 53 constituting the other side plate of the retainer, and in a split state, the pocket forming component 52 is machined from an axial direction X of the retainer so as to finish pockets 55 thereof such that a side 50a of the pillar 50 facing in the retainer revolving direction Y (a pocket surface of the pillar 50) is formed into any sectional configuration.

In an integral one-piece machined retainer, it is common that the sectional configuration of the pocket is straight along a radial direction Z of the retainer. For example, in an integral one-piece machined retainer for a ball bearing, as shown in a sectional view of FIG. 15, the pocket 55 is formed into a cylindrical configuration.

In addition, in a plastic retainer, since it is injection molded, even with an integral one-piece retainer, it is possible to form pockets into various sectional configurations.

In the split-type machined retainer, the pockets 55 are machined for finishing by inserting a machining part such as a milling cutter on a spindle of a tool in a prepared hole for the pocket with the spindle being oriented toward the retainer axial direction X and then translating the machining part so inserted in a direction normal to the retainer axial direction X for cutting. This inevitably generates burrs at portions where inside and outside diameter surfaces of the retainer main body and the pockets 55 intersect with each other, and therefore there needs a process posterior to the machining process for de-burring.

In addition, after the pockets 55 are machined for finishing there also needs a clamping process for fixing together the pocket forming component 52 and the flange component 53 which are separated. In this clamping process, the flange component 53 needs to be rivet joined to the pillars 50 of the pocket forming component 52, but the size allowed for a rivet 54 or a boss for use in fastening and fixing the components together is inevitably restricted by the specification of a bearing in which the retainer is to be installed. This may lead to a limitation to the strength of the pillars of the retainer.

On the other hand, when thinking of a retainer for a roller bearing, in a case where the pockets 55 are machined for finishing through milling and broaching, it is general from the fact that cutting is carried out in a state in which the spindle (the rotating shaft) of a cutting tool is oriented toward the retainer axial direction X that corner radii in the four corners of the pockets 55 are inevitably formed smaller than corner radii of end faces of rolling elements. In this conventional construction, great stress concentration is caused at the respective four corners of the pockets by the rolling elements while the bearing is in use, problems being thereby caused in relation to the accuracy and life of the retainer.

In addition, the above machining method for finishing cannot be used for the integral one-piece machined retainer.

On the other hand, in the integral one-piece machined retainer, as described above, the pockets 55 are generally formed into a straight configuration in section along the retainer radial direction, and in many cases this inevitably limits the guiding method for the retainer to a race guiding type. In order to make this integral one-piece machined retainer a rolling element guiding type, there needs a further machining process posterior to the process for machining the pocket 55 for finishing for providing in the pocket 55 a run-out preventing portion (an engagement portion) for control guiding a rolling element.

On the other hand, in the plastic retainer, in many cases the application thereof to a bearing is limited in terms of environment and specification by problems of strength and temperature caused in relation to the material (resin) of the case, and therefore an integral one-piece retainer has been demanded which can stand for a wider range of service conditions.

SUMMARY OF THE INVENTION

The present invention was made in view of the above problems. It is an object thereof to provide a retainer for rolling bearings that provides good pocket machining accuracy, and preferably suitable for an integral one-piece retainer.

To attain the object, according to a first aspect of the invention there is provided a retainer for rolling bearings wherein in machining a pocket for receiving therein a rolling element for finishing, a tool is prepared in which the contour of a machining part thereof coincides with a sectional configuration of the pocket as viewed along a retainer radial direction after the formation of the pocket is completed, and wherein the machining part of the tool is inserted into a prepared hole which is provided in advance for the pocket from the retainer radial direction and is then translated in axial and revolving directions of the retainer, whereby the pocket is formed.

Next, according to a second aspect of the invention, there is provided a retainer for rolling bearings as set forth in the first aspect, wherein the tool comprises a first tool for machining for finishing a pocket surface facing toward the revolving direction and a second tool for machining for finishing a pocket surface facing toward the axial direction and recesses.

Next, according to a third aspect of the invention, there is provided a retainer for rolling bearings, said retainer being for rolling bearings, wherein in machining a pocket for receiving therein a rolling element for finishing, a tool is prepared in which the contour of a machining part thereof coincides with a sectional configuration of the pocket as viewed along a retainer radial direction after the formation of the pocket is completed, and wherein the machining part of the tool is inserted into a prepared hole which is provided in advance for the pocket from the retainer radial direction and is then moved along a circle having its center at the center of the pocket, whereby the pocket is formed.

Next, according to a fourth aspect of the invention, there is provided a retainer for rolling bearings, said retainer being for roller bearings, comprising a plurality of pillars arranged in a revolving direction of the retainer and ring-like side plates for coupling the plurality of pillars at axial ends thereof, pocket surfaces being formed on sides of the pillars and side plates, recesses of the pocket being formed at portions where the pillars and side plates are joined to each other, wherein at least a portion of the pocket surface formed on the side of the pillar with which a rolling element is brought into contact is formed into an arc configuration in section along a retainer radial direction, and wherein a minimum plate width of the side plates at the recesses is made uniform along the retainer radial direction.

Next, according to a fifth aspect of the invention, there is provided a retainer for rolling bearings, said retainer being for roller bearings, comprising a plurality of pillars arranged in a revolving direction of the retainer and ring-like side plates for coupling the plurality of pillars at axial ends thereof, pocket surfaces being formed on sides of the pillars and side plates, recesses of the pocket being formed at portions where the pillars and side plates are joined to each other, wherein at least a portion of the pocket surface formed on the side of the pillar with which a rolling element is brought into contact is formed into an arc configuration in section along a retainer radial direction, and wherein the width in the retainer revolving direction of the pocket at an end thereof in the retainer radial direction is made slightly smaller than the diameter of a roller so as to form a run-out preventing portion for the roller at an end portion of the pillar in the retainer radial direction, axial end portions of the run-out preventing portion being separated from the side plates by the recesses, whereby the axial length of the run-out preventing portion is made shorter than the effective length of the roller.

Next, according to a sixth aspect of the invention, there is provided a retainer for rolling bearings, said retainer being for roller bearings, comprising a plurality of pillars arranged in a revolving direction of the retainer and ring-like side plates for coupling the plurality of pillars at axial ends thereof, pocket surfaces being formed on sides of the pillars and side plates, recesses of the pocket being formed at portions where the pillars and side plates are joined to each other, wherein at least a portion of the pocket surface formed on the side of the pillar with which a rolling element is brought into contact is formed into an arc configuration in section along a retainer radial direction, and wherein the width in the revolving direction of the pocket at an end thereof in the retainer radial direction is made slightly smaller than the diameter of a roller so as to form a run-out preventing portion for a roller at an end portion of the pillar in the retainer radial direction, the sectional configuration of the run-out preventing portion along the retainer radial direction on the pillar side being formed into a curved line smoothly connecting to the arc configuration of the pocket surface formed on the side of the pillar and having a radius of curvature protruding toward the pocket.

Here, the machining part of the tool means a cutting part for use in machining such as broaching and milling and an electrode portion of a special tool for use in electric discharge machining.

In addition, the contour of the normal machining part is configured as a leading end along the spindle (the rotating shaft or the like). However, the spindle becomes a reference axis for the contour so configured in a case where machining is carried out with the spindle of the machining part inserted into a prepared hole (that is, a blank hole) for a pocket being oriented toward a radial direction of the retainer, whereas in a case where machining is carried out with the spindle of the machining part inserted into a prepared hole for a pocket being inclined at a predetermined angle from the retainer radial direction, the inclined spindle becomes the reference axis for the contour of the machining part.

According to the invention, since machining for finishing the pocket surface is carried out by translating a machining part such as a cutting part or an electrode which has a contour identical to the designed configuration (the finished configuration) of any pre-set retainer pocket in axial and revolving directions of the retainer, there is generated no limitation to the sectional configuration of the pocket even with an integral one-piece retainer, and therefore the pocket surface can be formed into any configuration.

In addition, even with the retainer for ball bearings, as described in the third aspect of the invention, since the pocket surface is machined for finishing by moving the machining part along the circle having its center at the center of the pocket, the pocket surface of even an integral one-piece retainer can be formed into any configuration without any limitation to the pocket sectional configuration.

Even with a conventional integral one-piece machined retainer, therefore, the pocket sectional configuration does not have to be not limited to the straight configuration, and therefore the retainer guiding style of a rolling bearing incorporating therein a retainer according to the invention does not have to be limited to the race guiding style.

In addition, since a pocket sectional configuration of any radius of curvature can be provided by modifying the contour of the machining part, the pocket can be formed into any suitable configuration which can relax a stress generated from the contact of the rolling element received in the pocket with the retainer and improve the lubricating conditions.

At the same time as the pocket is so configured, corner radii in the four corners of the pocket can also be machined using the tool for use in machining the pocket for finishing, whereby the radius of curvature of the respective corner radii can be set to a radius of curvature greater than corner radii at end faces of a roller that is to be received in the pocket, thereby, when the retainer is used with a roller bearing, making it possible to relax stress concentrated at the corner radius portions of the pocket in the retainer in use.

Furthermore, the run-out preventing portion and edge portions can be formed at the same time as the pocket surface is machined for finishing by forming part of the contour of the machining part of the tool into configurations suitable for the run-out preventing portion (the engagement portion) for a roller and machining the respective portions so as to form the edge portions, thereby making it possible to prevent the generation of burrs that would take place when machining is carried out for finishing.

In addition, according to the second aspect of the invention, the two tools are constructed to be used for machining the pocket for finishing, resulting in inexpensive machining. In the retainer for roller bearings, the pocket surface formed on the pillar is different from the pocket surface formed on the side plate in sectional configuration along the retainer radial direction.

In addition, according to the fourth aspect of the invention, even if at least part of the pocket surface formed on the pillar is formed into the arc configuration along the retainer radial direction, since the minimum plate width of the side plate at the recess can be set as large as possible, the construction is advantageous in terms of the strength of the side plate.

At this time, in a case where, the second aspect of the invention being adopted, a second tool is used whose machining part is contoured straight, inexpensive machining can be carried out with the spindle of the machining part being oriented in the case radial direction.

At the joint portion of the side plate and in the vicinity thereof, the pocket surface configuration with which the rolling element is brought into contact becomes narrower on an outside diameter side of the retainer and/or an inner diameter side thereof in the retainer radial direction and is the widest substantially at a central portion in the retainer radial direction, in other words, the plate width of the side plate becomes thinner. Thus, the second tool having the machining part whose contour is straight is inclined at a predetermined angle to effect a deeper cutting to thereby form the recess. In other words, an inclination may be imparted to the straight cutting so as to effect a slightly deeper cutting at the central portion of the pocket in the retainer radial direction to thereby form the recess. Thus, the minimum plate width of the side plate can be set large at the recess by making uniform the minimum plate width along the retainer radial direction.

In addition, according to the fifth aspect of the invention, there is provided the retainer which facilitates the insertion of the roller into the pocket by making the axial length of the run-out preventing portion equal to or less than a certain dimension so that the roller can be inserted into the pocket without the necessity of largely deforming the axial end portions or portions in the vicinity of the side plates of the pillar of the retainer when the roller is tried to be inserted into the retainer.

Conventionally, as seen in Japanese Patent Unexamined Publication No. Hei.11-218135, the run-out preventing portion is provided such that the roller is pressed uniformly in the axial direction thereof when it is inserted into the pocket, and the axial end portions of the run-out preventing portion are connected to the side plates. Due to this, in the conventional construction, the pillar portions in the vicinity of the side plates are not deformed and hence tend to resist the insertion of the roller into the pocket, and therefore a larger insertion load is required even for the same engagement margin (a value resulting when the pocket width between the ends in the retainer radial direction is subtracted from the diameter of the roller). This construction results in an increase in surface pressure and facilitates the generation of damages to the roller.

To the contrary, in the fifth aspect of the invention, since the axial end portions of the run-out preventing portion are separated from the side plates by the recesses and hence the axial length thereof is equal to or less than the effective length of the roller, the roller can be inserted into the pocket without deforming largely the portions of the pillar in the vicinity of the side plates.

In addition, according to the sixth aspect of the invention, there is provided the retainer in which when the roller is inserted into the pocket, the roller is prevented from coming into edge contact with the side of the pillar, whereby no damage is caused to the surface of the roller.

In a conventional construction, as disclosed in Japanese Patent Unexamined Publication No. Hei.11-218135, since a plane portion is provided which connects to the arc of the pocket surface on the pillar, when the roller is inserted into the pocket, a great surface pressure is applied to the roller by virtue of a load from the edge as the roller passes a boundary between the surface constituting the arc and the plane portion, whereby the roller tends to be damaged easily. In addition, this construction also facilitates the generation of burrs when the roller is inserted into the pocket. These drawbacks are eliminated according to the invention.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the drawings:

FIG. 3 is a diagram as viewed from a retainer radial direction which explains machining for finishing according to the embodiment of the invention;

FIGS. 5A to 5D show, respectively, the results of calculations of the deformation of a pillar when assuming that a uniform surface pressure is applied by a roller when the pillar is inserted into a run-out preventing portion formed on the pillar of the retainer according to the embodiment of the invention, in which FIG. 5A shows a load condition when the length of the run-out preventing portion is 0.6 L, FIG. 5B shows a deflection caused under the load condition, FIG. 5C shows a load condition when the length of the run-out preventing portion is 0.9 L, and FIG. 5D shows a deflection caused under the load condition;

DESCRIPTION OF THE PREFERRED EMBODIMENTS

Referring to the accompanying drawings, an embodiment of the invention will be described below.

This embodiment will be described with reference to a roller guiding machined integral one-piece retainer for an NU218 cylindrical roller bearing.

Note that the NU218 cylindrical roller bearing is directed to one of bearings which substantially have a dimension based on ISO (for example, the NU218 bearing is a cylindrical roller bearing with an outer ring with a flange and has an inner diameter of 90 mm).

Figure 1:
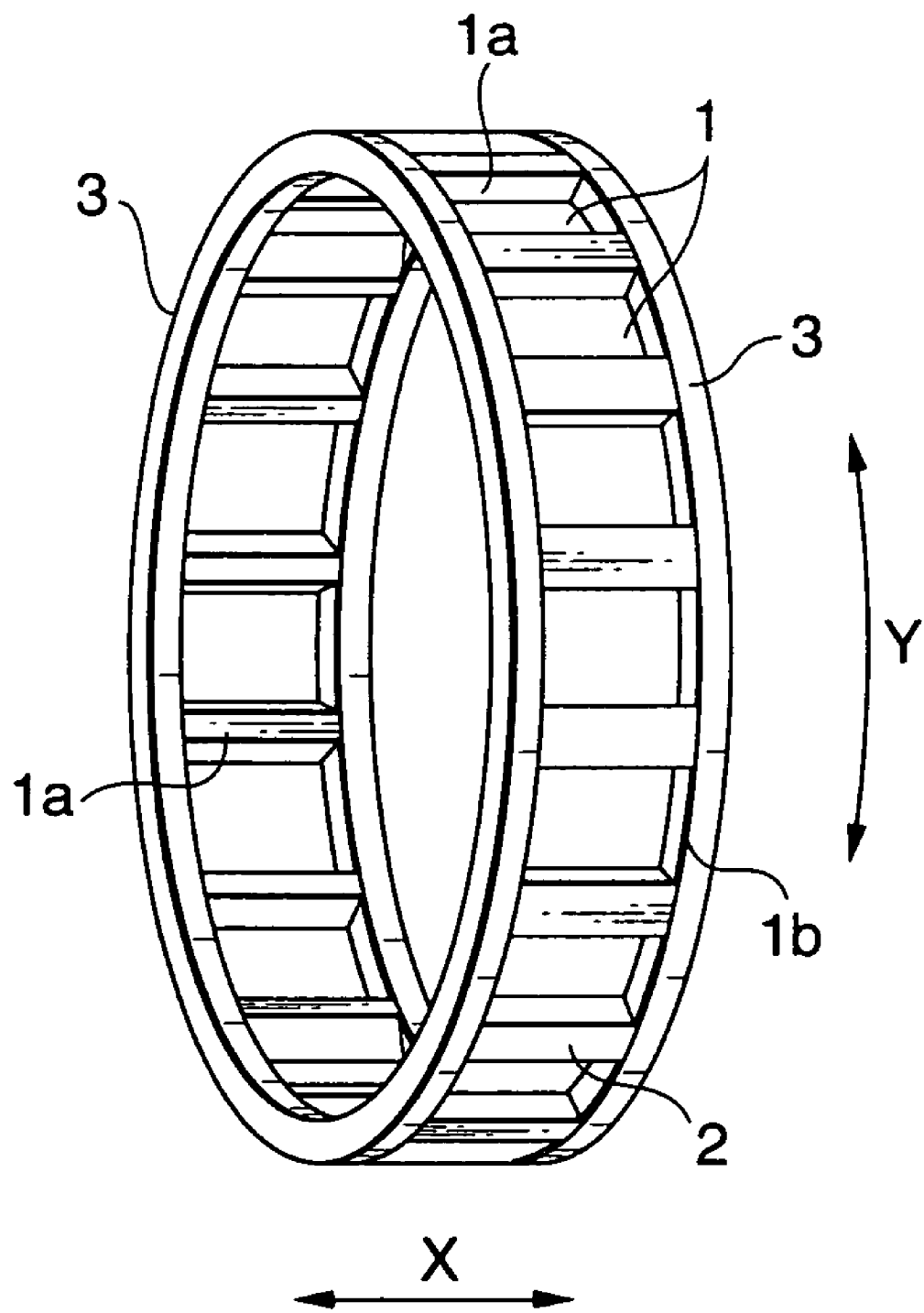
FIG. 1 is a schematic diagram of a roller guiding integral one-piece retainer for an NU218 cylindrical roller bearing according to an embodiment of the invention.

FIG. 1 is a perspective view showing a retainer in which the formation of pockets 1 is completed.

Figure 2:
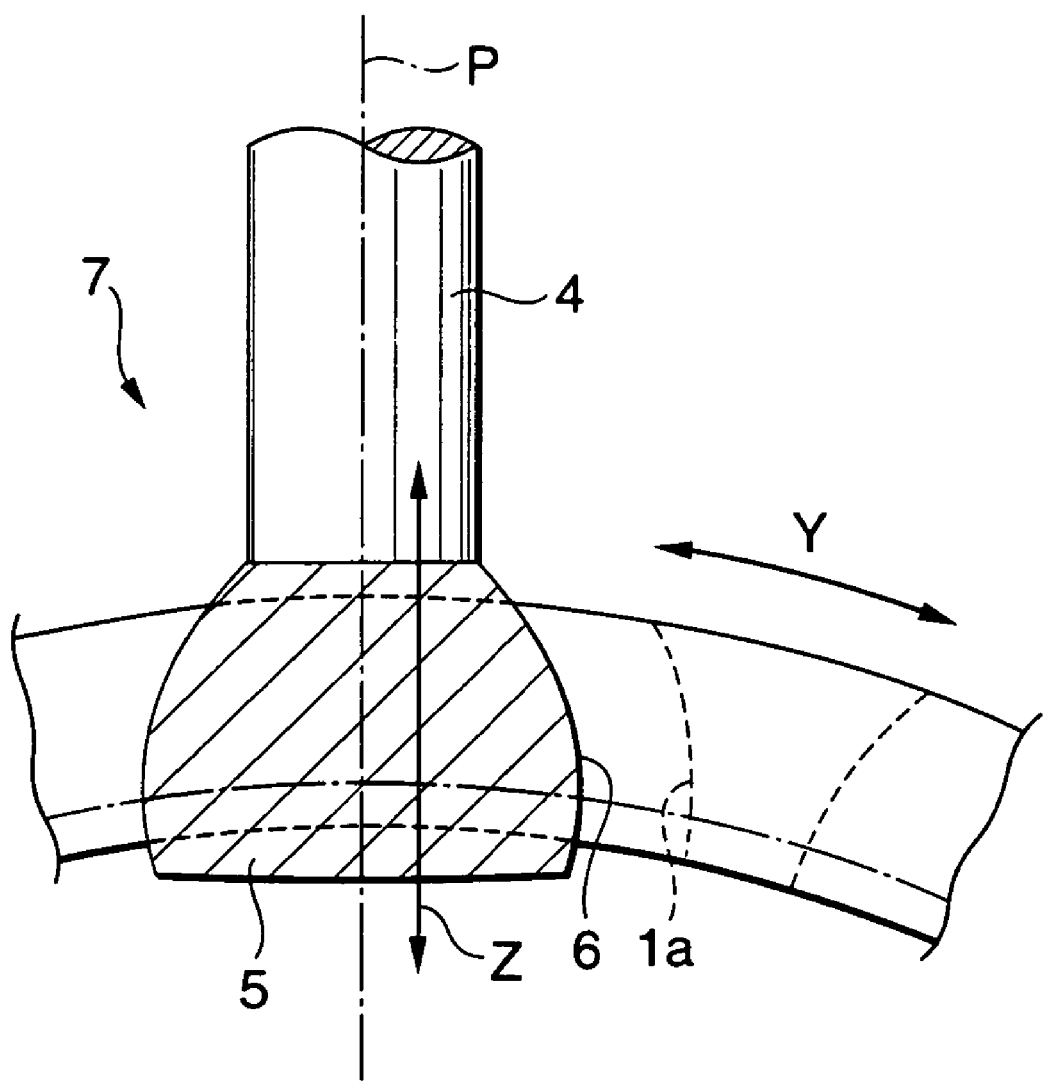
FIG. 2 is an explanatory diagram explaining the contour of a machining part according to the embodiment of the invention.

In this embodiment, as an example of the configuration of finished pockets 1, a surface 1a facing in a retainer revolving direction Y (a surface formed on a side of a pillar 2) is finished, as shown in FIG. 2, as an arc configuration having a predetermined radius of curvature along a retainer radial direction Z, while a surface 1b facing in a retainer axial direction X (a surface formed on a side of a side plate 3) is finished as a straight configuration along the retainer radial direction Z.

A machining part of a tool for machining the pockets 1 for finishing is constituted by a milling cutter 5 attached to a shank 4 (refer to FIG. 2).

As to the contour 6 of the milling cutter 5 of the tool 7 for forming the pocket surface 1a of the pocket 1 facing in the retainer revolving direction Y, the tip of a cutting part along the direction X of the rotating axis is set as an arc configuration having the predetermined radius of curvature as shown in FIG. 2 so as to coincide with an arc configuration which is identical with a sectional configuration 1a of the pocket after it is finished. This tool is called the first tool 7.

In addition, as to the contour of a milling cutter of a tool for forming the pocket surface 1b of the pocket facing in the retainer axial direction X, although not shown, the tip of a cutting part along the rotating axis is configured to be straight or into a cylindrical configuration and is thus set to a contour coinciding with a pocket sectional configuration along the retainer radial direction Z resulting after the pocket is finished. This tool is called the second tool 8.

As shown in FIG. 3 which is a view seen from the retainer radial direction Z, the milling cutters 5, 8a of the respective tools 7, 8 are sequentially inserted into a prepared hole for the pocket, which is provided in advance, from the retainer radial direction Z (in this embodiment, from an outside diameter side), and in such a state, the tools 7, 8 are then translated in the retainer axial direction X and revolving direction Y, respectively, while the milling cutters 5, 8a are kept rotating on the respective rotating axes so that the pocket 1 is machined to be formed into a target sectional configuration.

In other words, in machining for finishing using the first tool 7, as shown in FIG. 3, the milling cutter 5 is inserted into the pocket from the retainer radial direction Z so as to be applied to one end of the surface 1a facing in the retainer revolving direction Y with a rotating axis P of the milling cutter 5 being kept to be oriented in the retainer radial direction Z and the milling cutter 5 being rotated on the rotating axis and is simply translated straight in the retainer axial direction X while keeping the rotating axis P and the milling cutter 5 in the same states for machining the pocket surface 1a facing the retainer revolving direction Y. This procedure is carried out for two surfaces, so that the pocket surfaces of the pillar 2 are formed into a sectional configuration identical to the contour 6 of the milling cutter 5, that is, into any designed sectional configuration.

Similarly, the milling cutter 8a of the second tool 8 is inserted into the prepared hole so as to be applied to one end of the surface 1b facing in the retainer axial direction X with a rotating axis of the milling cutter 8 being kept to be oriented in the retainer radial direction Z and the milling cutter 8 being rotated on the rotating axis and is simply translated straight in the retainer revolving direction Y while keeping the rotating axis and the milling cutter 5 in the same states, whereby the pocket surface 1b facing the retainer axial direction Z or the pocket surface of the side plate 3 is machined into a straight configuration.

While machining the pocket surface 1b facing in the retainer axial direction X with the second tool 8, recesses 1c are machined into four corners of the pocket by translating the milling cutter 8a of the second tool 8 toward the respective four corners, whereby the radius of curvature of respective corner radii in the four corners becomes equal to or larger than the rotating radius of the milling cutter 8a.

Thus, if the tip of the cutting part along the rotating axis of the second tool 8 is configured to be cylindrical and the second tool 8 is then translated in such a manner as to machine the four corners of the pocket 1 to thereby form recesses 1c therein, the minimum plate width t (refer to FIG. 3) of the side plate at the recess 1c becomes uniform, thereby making it possible to make the maximum value of the receding dimension from the pocket surface 1b minimum. Thus, this can be said to be the best design when thinking of the strength of the side plate of the retainer.

In addition, since not only the first tool 7 but also the second tool 8 is translated for machining, machining can be effected inexpensively. Furthermore, since the pocket 1 is machined for finishing only with the two tools 7, 8, as a result, machining can be effected inexpensively.

Figure 4:
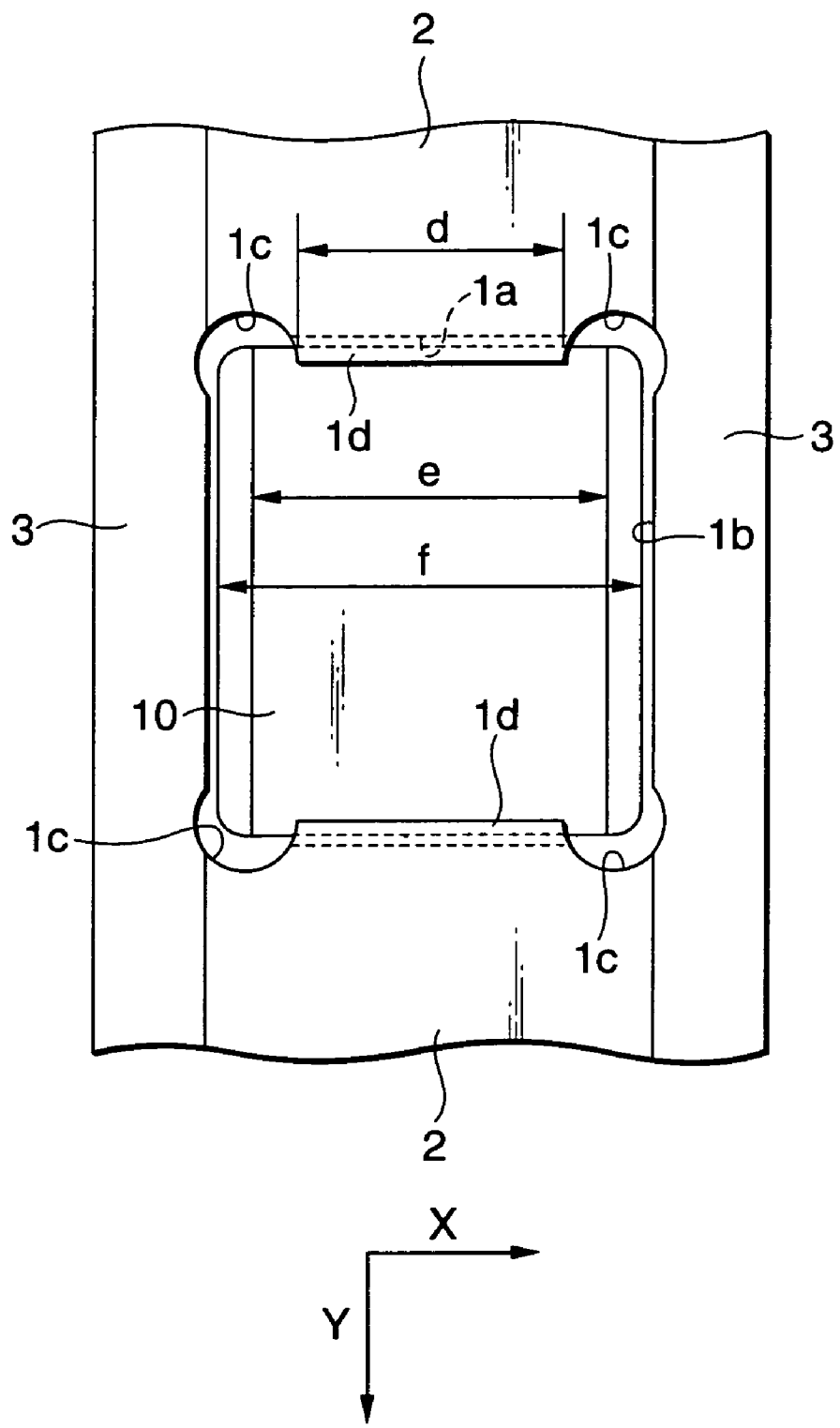
FIG. 4 is a diagram as viewed in the radial direction from the outer circumference of the retainer according to the embodiment of the invention which shows a state in which a roller is installed in the retainer.

In this embodiment, as shown in FIG. 4, the pocket width in the retainer revolving direction at an end portion in the retainer radial direction is set slightly smaller than the diameter of a roller, whereby a run-out preventing portion 1d for a roller is formed at an edge portion of the pillar 2 in the retainer radial direction. However, axial ends of the run-out preventing portion so formed are separated from the side plates 3 by the recesses 1c, and the axial length d of the run-out preventing portion 1d is equal to or less than the effective length e of the roller. This roller effective length is a length resulting when chamfered lengths at the ends are subtracted from the full length of the roller and an axial length which is in contact with the pocket surface 1a of the pillar.

Here, in a conventional case, as is described in Japanese Patent Unexamined Publication No. Hei.11-218135, the run-out preventing portion is provided along the full length of the roller effective length, hence axial ends of the run-out preventing portion couple to the side plates, and the roller is axially uniformly pressed by the run-out preventing portion when it is inserted into the pocket, whereby the prevention of damages to the roller is aimed at. In practice, however, the result contradicting the aim, since deformations in the vicinity of the roots of the pillar (in the vicinity of the side plates) become smaller than a deformation in the vicinity of the central portion thereof due to a deformation curve resulting when the roller is inserted into the pocket, the surface pressure of the roller becomes drastically high at the axial ends of the pillar, and thus this construction facilitates causing damages to the roller.

This can be confirmed through a simple calculation. To be specific, assuming that the sectional secondary moment is I and that axial ends of a pillar of a retainer which is formed from a material having a modulus of longitudinal elasticity E are supported on free fulcrums, when deformations at the ends of the run-out preventing portions when a certain uniform surface pressure is applied to the run-out preventing portion $1d$ from the radial direction are obtained for cases where the axial length of the run-out preventing portion is 0.6 times the full length of the pillar in length as shown in FIG. 5A and where the former is 0.9 times the latter in length as shown in FIG. 5C, obtained are 0.0062 $pL^4/EI$ and 0.0020 $pL^4/EI$ as shown in FIGS. 5B and 5D, respectively. In other words, as shown in FIGS. 5A to 5D, it is indicated that with the same surface pressure being applied, the longer the axial length of the run-out preventing portion becomes, the smaller the pillar deforms at the ends of the run-out preventing portion. Since it was assumed in the above calculations that the roots at the pillar are free fulcrums and that the surface pressure is uniform in the axial direction, although, strictly speaking, the set environment was different form the actual case, the results of the strict calculations indicate that there is a consistent tendency that the longer the axial length of the run-out preventing portion becomes, the smaller the pillar deforms at the ends of the run-out preventing portion. When the roller is inserted into the pocket, comprehensively speaking, since the engagement margin on the pillar is deformed, to refer to the results of the above calculations in other words, with the same engagement margin, the longer the axial length of the run-out preventing portion becomes, the higher the surface pressure increases.

Moreover, a certain tolerance is required for actual machining, and therefore it is natural that the engagement margin scatters. The engagement margin has to be designed such that the roller 10 does not run out when it is set at a minimum value, while no damage is caused to the roller 10 when it is inserted into the pocket when the margin is set at a maximum value, but the longer the axial length of the run-out preventing portion becomes, the narrower the tolerance for the engagement margin becomes, and hence it gets difficult to prevent the roller 10 from being damaged.

To cope with this, according to a construction of this embodiment, the axial length of the recess $1c$ located at the axial ends of the pillar is made relatively longer, and the length d of the run-out preventing portion $1d$ is made equal to or less than the roller effective length e even when the former is set at its maximum value, whereby no large surface pressure is designed to be generated when the roller 10 is inserted into the pocket.

Moreover, from the viewpoint of performance, it is found that it is effective to produce a uniform lubrication film on the rolling surface of the rolling element to stabilize the posture of the rolling element (suppression of skewness) and to control noise. To this end, it is desirable to make the length d of the run-out preventing portion as long as possible in order to have constant oil film formation in an axial direction of the rolling surface.

Therefore, the axial length of the run-out preventing portion with which the likelihood that the roller 10 is damaged when it is inserted into the pocket is kept as low as possible while the rotating performance thereof is maintained is equal to or less than the roller effective length e and preferably greater than 0.75 times the roller effective length e. In a case where the axial length of the run-out preventing portion is set at 0.75 times or less the roller effective length e in length, when a retainer and roller assembly comprising a retainer and rollers is installed between races, the rollers are inclined, this making it difficult to so install the retainer and roller assembly.

Thus, the construction according to this embodiment restrains the reduction in rotating performance and prevents the generation of large surface pressure, as well as causing damages to the roller.

Machining as described above is repeated in all the prepared holes for pockets, whereby the pockets 1 of the retainer are formed into a target configuration.

As described heretofore, even with the integral one-piece retainer, the pocket sectional configuration can be set as required by suitably modifying the contours of the milling cutters 5, 8a.

In addition, when machining the pocket surfaces, the tools corresponding to the respective pocket surfaces $1a$, $1b$ are simply translated straight along the retainer revolving direction Y and the retainer axial direction X, respectively, for machining, and thereby a target sectional configuration can be formed. Moreover, since the accuracy in such machining can depend upon the machining accuracy (such as accuracy in positioning) inherent in a machine tool used and the circumferential indexing accuracy, the accuracy of respective machined portions of the retainer can be set high.

In addition, since any radius of curvature can be imparted to the pocket sectional configuration by modifying the contour of the machining parts of the tools 7, 8, in a rolling bearing installing therein the retainer according to this embodiment, it is possible not only to alleviate the contact stress between the rollers 10 installed in the pockets 1 and the retainer but also to improve the lubricating conditions.

During such machining, the radius of curvature of the respective corner radii in the four corners of the pocket 1 can also be set larger than the corner radii at end surfaces of the rolling element to thereby alleviate stress concentration when the bearing is in use, which leads to the prevention of deterioration with age in the accuracy of the retainer and improvement of the life of the bearing.

Figure 6:
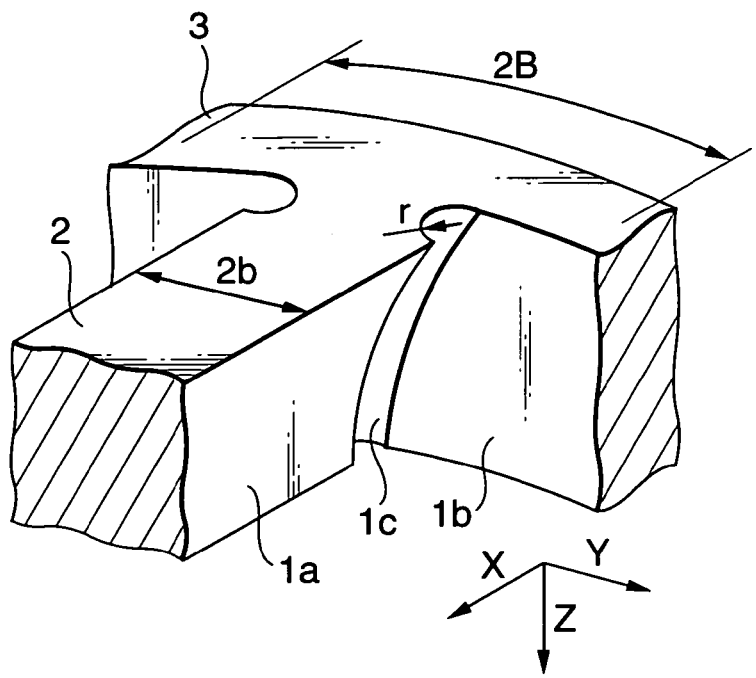
FIG. 6 is a schematic diagram showing a machined configuration of a recess that is formed in four corners of a pocket in the retainer according to the embodiment of the invention.

Here, while the machining of the corner radius with the second tool 8 is described, as shown in FIG. 6, the recesses $1c$ in the four corners may be machined with the first tool 7 or a third tool may be prepared for machining. Furthermore, the surface $1b$ facing in the retainer axial direction X may be machined with the first tool 7 to thereby obviate the necessity of the second tool 8.

In addition, although not shown in detail in FIG. 2, in a case where the contour of the machining part located at a position facing the corner portion at the ends of the pocket 1 in the retainer radial direction Z, i.e., the corner portion where the inside and outside diameter surfaces of the retainer main body intersect with the pocket 1 is configured such that the corner portion is machined so as to form a de-burring C chamfer (a 45-degree chamfer), at the same time as the pocket surface is machined for finishing, the generation of burrs at the portion where the inside and outside diameter surfaces of the retainer intersect with the pocket can be prevented. In addition, the machining part may be formed into any radius configuration in order to improve the lubricating capability rather than de-burring.

Figure 7:
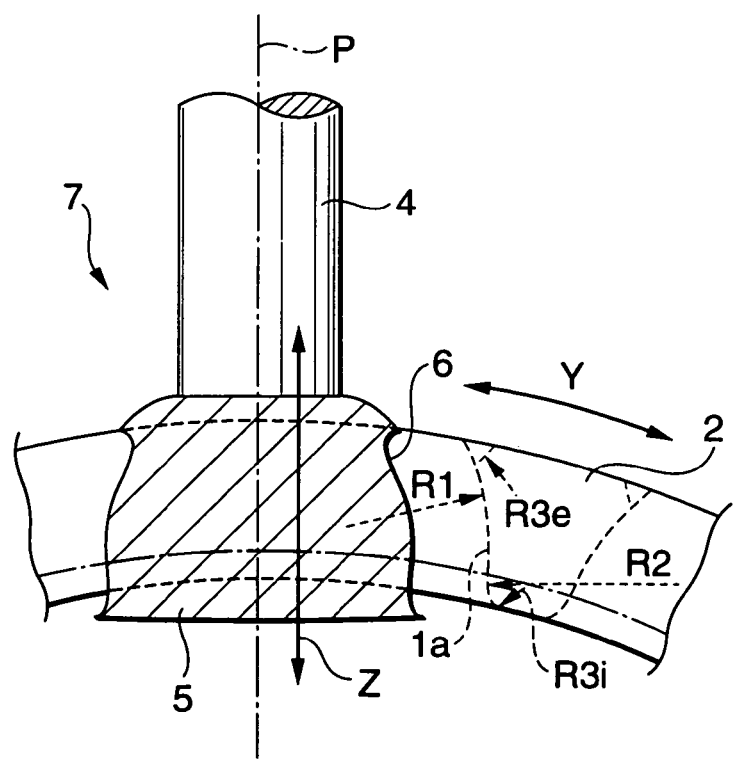
FIG. 7 is an explanatory view illustrating the contour of a machining part according to a second embodiment of the invention.

For example, the contour 6 of the milling cutter 5 of the first tool 7 is formed into a configuration shown in FIG. 7 so as to machine an arc surface with which the roller 10 comes into contact and a pillar side surface of the run-out preventing portion $1d$ which follows the arc surface in the sectional configuration of the pocket surface $1a$ after the finishing of the pocket is completed. The sectional configuration of the arc surface is formed into an arc configuration having a radius of curvature R1 which is 0.05 to 0.25 mm larger than the radius of the roller 10, and the surface of the run-out preventing portion $1d$ smoothly connects to end portions of the arc. In the sectional configuration of the surface of the run-out preventing portion, the center of the radius of curvature is located on the pillar 2 side which is opposite to the arc, in other words, the surface of the run-out preventing portion 1d is formed into a curved line configuration, in section, projecting toward the pocket side, and the run-out preventing portion 1d is formed by a surface having a radius of curvature R2 which is substantially 10 to 100 times larger than the diameter of the roller and an R chamfer portion formed at the boundary between the pillar 2 and the outside diameter surface and the inside diameter surface. The sectional configuration of the R chamfer portion may be an (outer circumference surface side) arc curve having a radius of curvature R3e which is substantially 2 to 5% of the diameter of the roller, for example, on the outside diameter side while it may be an arc curve having a radius of curvature R3i (or a C chamfer) of substantially 0.1 to 0.8 mm on the inside diameter surface side.

With those constructions, since not only can the lubricating capability be improved but also the curve having the radius of curvature R1 and the curve having the radius of curvature R2 are smoothly connected to each other via their point of intersection, when the roller 10 is inserted into the pocket 1, there can be no edge contact between the roller 10 and the side of the pillar 2, the surface of the roller 10 being thereby prevented from being damaged.

Here, the reason why the center of the curve having the radius of curvature R2 is made to project toward the pillar side or the pocket side is because the width of the pocket on the inlet side (in this embodiment, the inside diameter side) from which the roller 10 is inserted into the pocket 1 is increased, so that the insertion of the roller 10 into the pocket is facilitated and additionally the generation of burrs is made difficult.

An optimal engagement margin with which the roller 10 does not have to get damaged when it is inserted into the pocket and the roller 10 is prevented from running out of the retainer while the bearing is in use is substantially 0.001 to 0.008 times the diameter of the roller in length. If the engagement margin is equal to or less than 0.001 times the roller diameter, there is a risk of the roller running out of the retainer due to scattering of the machining tolerance, while if the engagement margin is equal to or larger than 0.008 times the roller diameter, a large surface pressure is caused on the roller 10 when the roller 10 is inserted into the pocket 1, whereby the roller tends to be damaged easily.

In this embodiment, while the roller 10 is described as being inserted into the pocket from the inside diameter side (NU type), it is needless to say that the roller may effectively be inserted from the opposite side, i.e., from the outside diameter side (N type).

Thus, as described heretofore, according to the invention, since the retainer formed based on the invention can have any pocket sectional configuration and the roller bearing using the retainer so formed can alleviate the stress concentration at the corners of the pockets, it possible to provide an integral one-piece retainer which allows a wide variety of designs. Thus, the conventional issues on the strength and service environment of bearing retainers can be solved.

In this embodiment, while the brass machined integral one-piece roller guiding retainer is described as being machined, naturally, the machining of the pockets for finishing according to the invention may be possible even with a plastic retainer or a pressed retainer irrespective of the material and configuration of a retainer. In other words, the invention is not limited to the machined retainer. In addition, the invention is not limited to the integral one-piece retainer but may be applied to a split-type retainer.

Moreover, the sectional configuration of the respective pockets facing in the retainer revolving direction Y does not have to be limited to the sectional configuration described in this embodiment but may be formed into a straight configuration, a convex configuration and a multi-sectional configuration. It is natural that the pocket surface configuration formed on the side plate 3 facing in the retainer axial direction X which determines the pocket axial width X does not have to be limited to those described in this embodiment but may be formed into a convex configuration, a concave configuration and a multi-sectional configuration.

Furthermore, in this embodiment, while finishing is described as being carried out using machining, special machining including electric discharge machining may be used for finishing. In this case, the contour of the electrode part may be set so as to coincide with the pocket sectional configuration of the respective pockets machined for finishing.

In addition, it is not always necessary that a finishing process including machining has to be carried out in the state in which the axis (rotating axis) of the machining part 5 coincides with the retainer radial direction Z, but the finishing process may be carried out by translating the machining part 5 in the retainer revolving direction Z with the axis of the machining part being held inclined through a predetermined angle from the retainer radial direction Z.

This is because the tool diameter may have to be made large depending upon the pocket sectional configuration, and if machining is carried out with the axis (rotating axis) of the machining part coinciding with the retainer radial direction Z, there may be a risk of the recesses in the four corners of the pocket being made larger than required due to the increased diameter of the tool. Due to this, it becomes difficult to assure that the axial length with which the roller 10 is brought into contact becomes equal to or larger than 0.75 times the roller effective length.

In contrast with this, in a case where machining is carried out with the axis of the machining part being inclined through the predetermined angle, it is possible to reduce the diameter of the tool within a range permissible within the pocket sectional plane, and this may function effectively against the above drawback.

Here, there is prescribed nothing specific on the machining of the prepared holes for pockets which are not machined for finishing, and therefore drilling may be used. Alternatively, for example, in a prior process, prepared holes may be roughly provided using casting. The process for providing prepared holes and the contents thereof may be determined in view of costs or the like by aiming at reducing the machining time for finishing by largely reducing the machining margin in machining for finishing or similarly aiming at reducing the machining time for finishing by forming in advance recesses in the four corners of pockets, for example, at the time of casting.

While the verification is carried out on a single-row type bearing in this embodiment, it is needless to say that the retainer of the embodiment may be used for a double-row type bearing.

Next, referring to the accompanying drawings, a second embodiment will be described below. In the description below, like reference numerals are imparted to members like to those described in the above embodiment.

Figure 9:
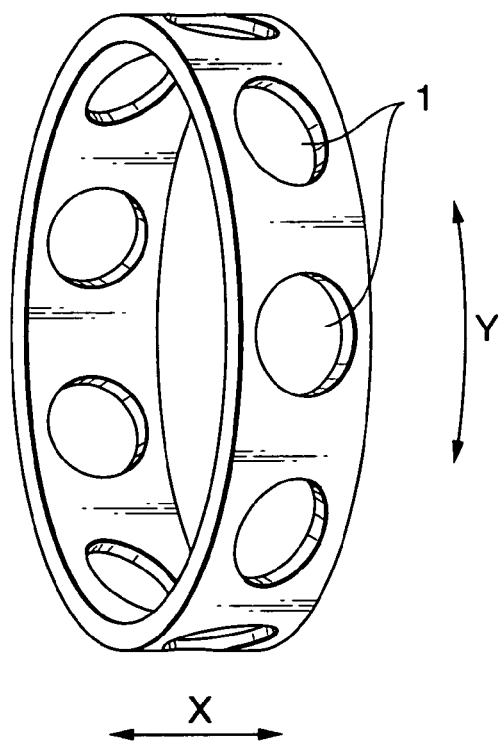
FIG. 9 is a schematic perspective view illustrating a roller guiding integral one-piece retainer for an angular ball bearing according to the second embodiment of the invention.
Figure 10:
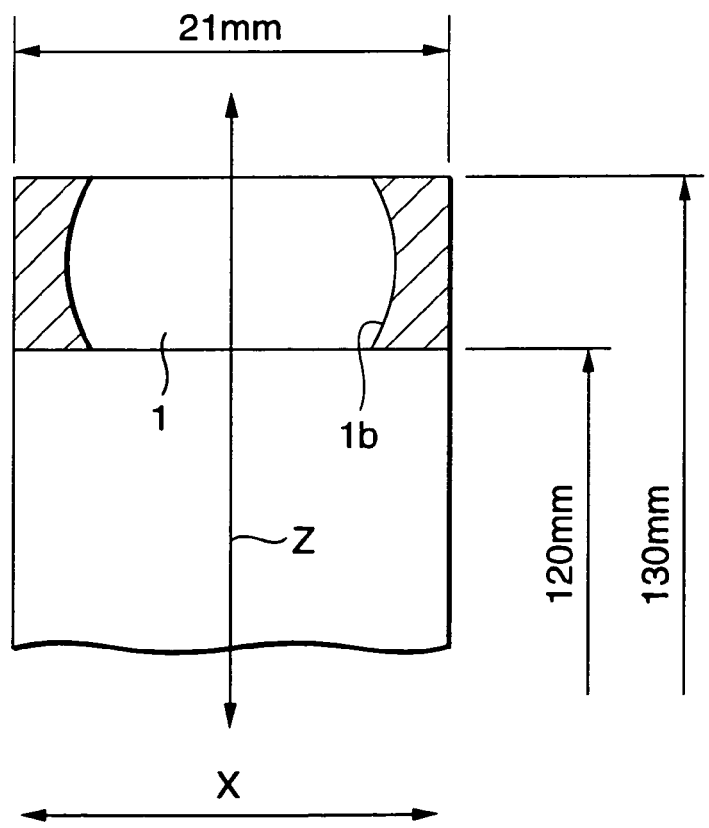
FIG. 10 is a partially enlarged diagram illustrating the roller guiding integral one-piece retainer for an angular ball bearing according to the second embodiment of the invention.

This embodiment relates to a retainer for a ball bearing. In other words, this embodiments describes a roller guiding machined integral one-piece retainer for an angular ball bearing. FIG. 9 is a schematic perspective view showing a retainer in which the formation of pockets is completed, and FIG. 10 is a sectional configuration thereof.

In addition, the material of the retainer according to the embodiment is formed of high-strength brass, and for example, the dimensions thereof are ø130 mm in outside diameter, ø120 mm in inside diameter and about 21 mm in width, and pockets are dimensioned such that balls as rolling elements of a certain dimensions (the diameter is about ø12 mm) can be received therein.

Figure 11:
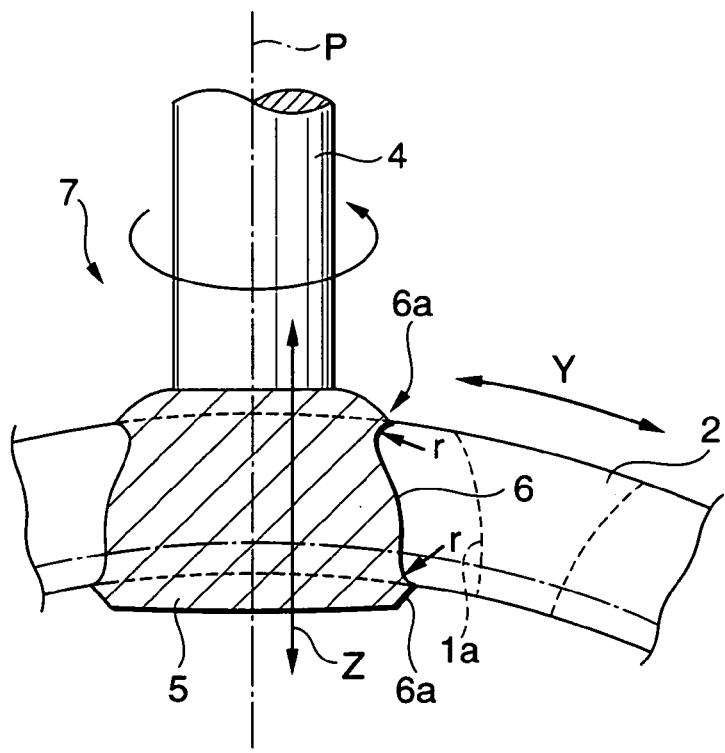
FIG. 11 is a diagram illustrating the contour of the machining part according to the second embodiment of the invention.

In this embodiment, a machining part of a tool for machining pockets 1 is constituted by a milling cutter 5 mounted on a shank 4 (refer to FIG. 11). The contour 6 of the milling cuter 5 is set such that the configuration of the tip of a cutting part along the rotating axis direction X is formed into an arc configuration having a predetermined radius of curvature which is the same configuration as that of the pocket sectional configuration which is designed in advance as shown in FIG. 11, the arc configuration being set as an arc identical to the pocket sectional configuration 1a of pockets resulting when they are finished.

Figure 12:
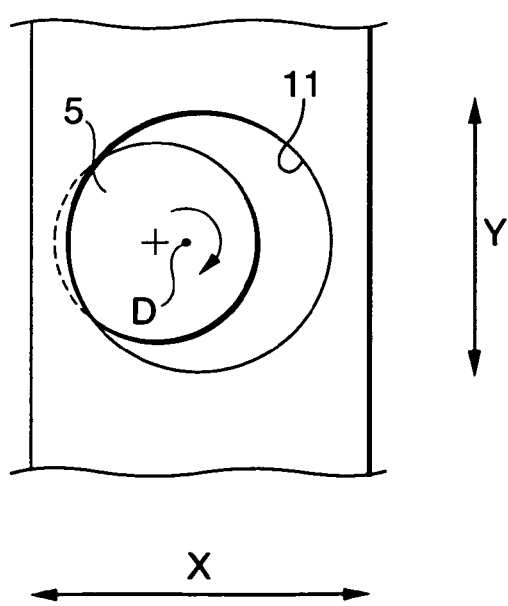
FIG. 12 is a schematic diagram showing machining according to the second embodiment of the invention.

Then, as shown in FIG. 12 which is a view seen from the retainer radial direction Z, the milling cutter 5 which is the machining part of the tool is inserted into a prepared hole 11 formed through machining in advance from the retainer radial direction Z (in this embodiment, from the outside diameter side), and the milling cutter 5 is then moved in a direction normal to the axis of the retainer in that state. Thereafter, the milling cutter 5 is moved along a circle whose center is located at the center D of the pocket with the milling cutter being rotated about the axis thereof, whereby the pocket 1 is machined to form a target sectional configuration.

This machining process is repeated for the respective pockets in the retainer, whereby all the pockets can thus be machined. Moreover, since the accuracy at the respective portions of the pocket can depend upon the machining accuracy inherent in the tool used and the circumferential indexing accuracy, the accuracy at the respective portions of the retainer is also guaranteed.

Here, in this embodiment, as shown in detail in FIG. 11, a de-burring arc-like chamfer is formed on the milling cutter 5 at a portion thereon where the inside and outside diameter portions of the retainer main body intersect with the inside and outside diameter portions (a portion indicated as 6a in FIG. 11), whereby the generation of burrs is prevented at the same time as machining is carried out.

Figure 15:
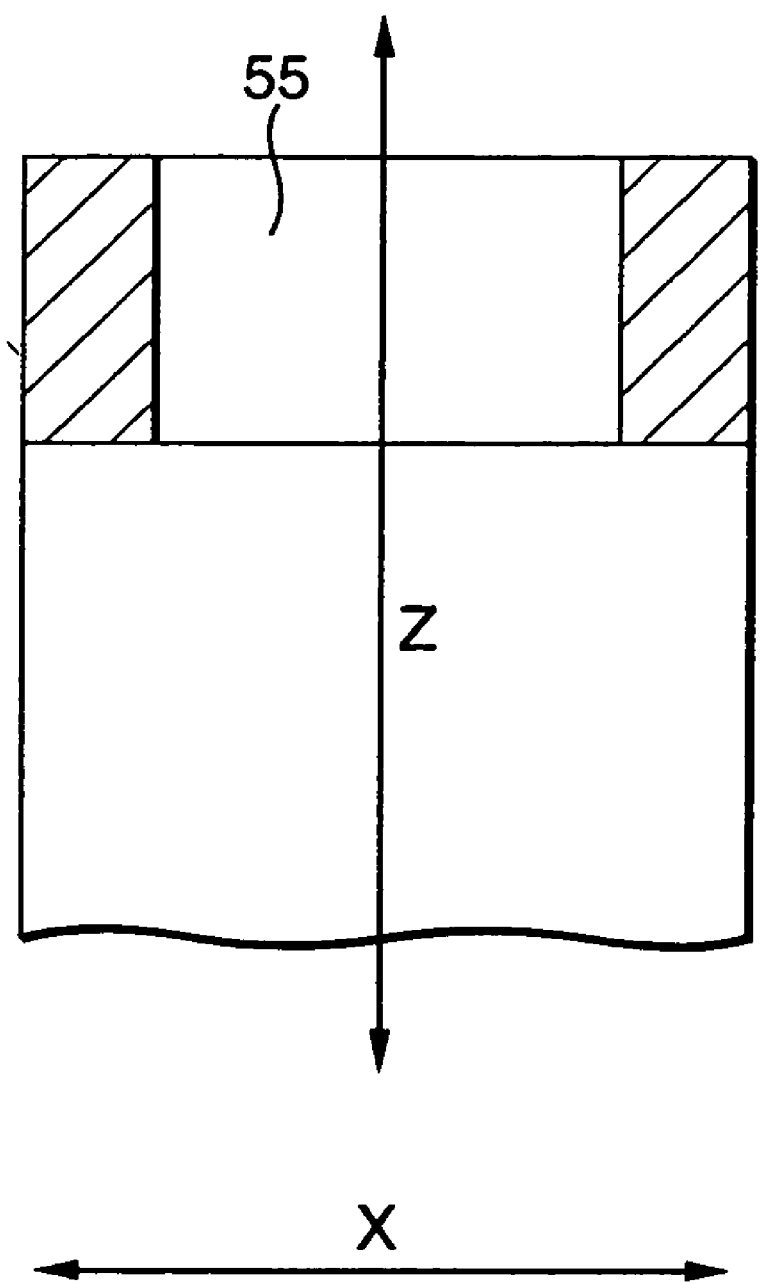
FIG. 15 is a sectional view showing a conventional integral one-piece retainer representative of retainers for ball bearings.

As shown in section in FIG. 15, the conventional retainer is of integral one-piece type, but the standard sectional configuration of the pocket is straight (a cylinder). In a case where the pocket surface is formed into a spherical configuration as in the case with the invention, the improved lubricating capability can be expected when compared to the conventional straight pocket surface configuration, and the surface pressure between the balls in the pockets 1 and the retainer becomes small to thereby suppress the wear of the retainer.

In this embodiment, the portions into which the balls are inserted are machined slightly smaller than the diameter of the respective balls, and therefore the retainer and the balls are constructed so as to be prevented from being split.

In addition, it is confirmed that a race guiding system can be obtained in any fashion by adopting this embodiment of the invention.

Moreover, while the pocket sectional configuration is described as being constituted by a single arc in this embodiment, it is natural to say according to the embodiment that the pocket sectional configuration may be formed into any configuration.

Thus, in this embodiment, since the pocket 1 for receiving therein the balls can be formed only by moving along the circle having its center at the center of the pocket the cutting part (or an electrode) attached to a shaft normal to or inclined at a certain angle in the radial direction Z relative to a section parallel to the retainer revolving direction Y and having in advance any retainer pocket design configuration, any configuration can be provided without limitation by the pocket configuration itself. Therefore, as with the conventional example, the sectional configuration of the pockets 1 of the retainer does not have to be limited to the straight configuration but may be of any configuration including the straight configuration, a convex configuration and a multi-sectional surface configuration. There is imposed no limitation to the retainer guiding style.

In addition, since the pocket sectional configuration can be formed into any configuration having a desired radius of curvature, the contact stress between the balls in the pockets and the retainer can be alleviated, and the lubrication conditions can also be improved.

Furthermore, the machining of the run-out preventing portion for a rolling element (the engagement portion) and the edge portions at the respective portions can be performed at the same time, and burrs that would be generated during machining can be eliminated.

Thus, according to the retainer resulting using the machining method of this embodiment, since the retainer can hold any pocket configuration, it is possible to provide an integral one-piece retainer that allows a wide variety of designs therefor, whereby the conventional issues on strength and service environment of the bearings waiting long for solution can be solved.

In this embodiment, while the brass machined retainer is illustrated, the invention is not limited thereto but, needless to say, may be modified variously within the range of the invention without being restricted in terms of retainer materials and retainer configurations, including, as examples, an integral one-piece roller guiding retainer for a phenol resin retainer, a plastic retainer and a pressed retainer.

Moreover, although there is prescribed nothing as to a prior process for pockets in this embodiment, for example, pockets may be roughly formed in a prior process, and described in this embodiment, if the milling process margin is largely reduced, since the machining time can be reduced, the pre-formation of pockets in the prior process may be considered in conjunction with a matter of cost.

Next, a third embodiment will be described. Like reference numerals are imparted to members like to those described in the respective embodiments above.

Figure 13:
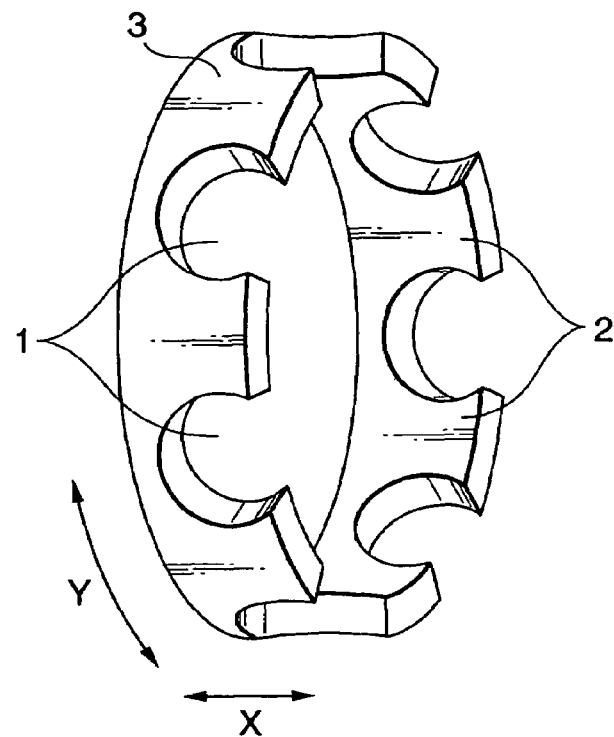
FIG. 13 is a schematic perspective view illustrating a retainer for a ball bearing according to a third embodiment of the invention.
Figure 14:
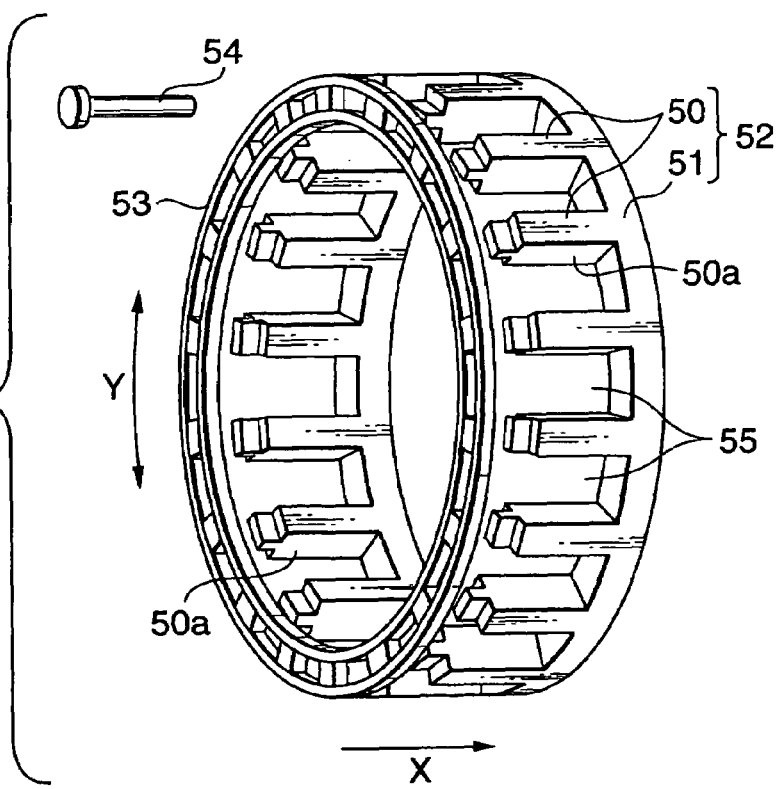
FIG. 14 is a schematic diagram showing a conventional split-type machined retainer.

This embodiment relates to a roller guiding machined integral one-piece retainer for a 6330 ball bearing, and a crown type retainer will be illustrated as an example. FIG. 13 is a schematic perspective view showing a retainer in which the formatio of pockets 1 is completed.

Note that the 6330 ball bearing is directed to one of bearings which substantially have a dimension based on the International Organization for Standardization (ISO) (for example, the 6330 ball bearing is a single raw deep groove ball bearing having an inner diameter of 150 mm).

The retainer of this embodiment is formed of phenol resin and is dimensioned as 258 mm in outside diameter, 220 mm in inside diameter and about 33 mm in width, and pockets 1 thereof are sized so as to receive therein as a rolling element a ball having a diameter of about 48 mm.

The summary of machining is generally identical to that of the above second embodiment (the angular bearing). A milling cutter formed into a pre-designed configuration which is identical to the sectional configuration of pockets 1 is inserted into a pre-machined hole from the retainer radial direction (in this embodiment, from the outside diameter side), in this state is moved along a circle having its center at the center of the pocket, and thereafter is withdrawn to one of the axial directions, whereby the pocket may be machined so as to be formed into any pocket sectional configuration.

Although not shown in here, any of conventional types is a split-type (two components are fastened together with rivets), and the pocket configuration of straight-type (cylindrical or circular conical configuration) is the standard.

Machining like this is repeated for all the prepared holes for pockets, whereby all the pockets can be machined. Moreover, since the accuracy at the respective machined portions can depend upon the machining accuracy held by a machine used, the accuracy at the machined portions of the retainer can guaranteed.

It is confirmed that the retainer according to the invention can provided a race guiding system as required.

In addition, while the pocket sectional configuration is described as being constituted by the single arc in this embodiment, naturally, it is needless to say that any configuration may be dealt with.

The other features of the construction, operation and advantages are identical to those described in the second embodiment.

EXAMPLE 1

A retainer was prepared based on the machining according to the invention.

The retainer was a roller guiding machined integral one-piece retainer for an NU 218 cylindrical roller bearing was roughly dimensioned as 138 mm in outside diameter, 116 mm in inside diameter and about 30 mm in width, and the size of pockets 1 thereof were set so as to be identical to the size of a rolling element as a ball (diameter=19 mm, length=20 mm).

Note that the NU218 cylindrical roller bearing is directed to one of bearings which substantially have a dimension based on ISO (for example, the NU218 bearing is a cylindrical roller bearing having an outer ring with a flange and has an inner diameter of 90 mm).

Then, the accuracy of a circumferential inclination of the pillar 2 relative to the retainer axial direction X (an inclination toward the retainer revolving direction Y) was measured with a straightness measuring device using one of the side plates (machining reference portion) as reference to confirm that the average of inclinations ranges in the order of 0 to 10 microns and is stable with high accuracy.

With the conventional split-type machined retainer, the circumferential inclination generally ranges in the order of 15 to 40 microns, and it is seen from this that the retainer in which the pockets were formed in accordance with the machining of the invention provides a retainer with high accuracy when compared to the conventional one.

EXAMPLE 2

Next, an example of corner radii machined in the four corners of the pocket will be described.

A retainer used in this example was a roller guiding machined integral one-piece retainer for an NU 330 cylindrical roller bearing which was roughly dimensioned as 265 mm in outside diameter, 230 mm in inside diameter and about 64 mm in width, and the size of pocket portions thereof were set so as to be identical to the size of a rolling element as a ball (diameter=45 mm, length=45 mm).

Note that the NU330 cylindrical roller bearing is directed to one of bearings which substantially have a dimension based on ISO (for example, the NU330 bearing is a cylindrical roller bearing having an outer ring with a flange and has an inner diameter of 150 mm).

Recesses are provided in the four corners of the pocket using a machining method similar to that used in the above embodiments. However, the machining was carried out using the first tool 7.

It is believed that stress generated in the corner radii portions is increased to a maximum of substantially three times the standard stress by the stress concentration rate depending on the size of the radius of curvature r of the corner radii in the four corners of the pocket (refer to FIG. 6).

Figure 8:
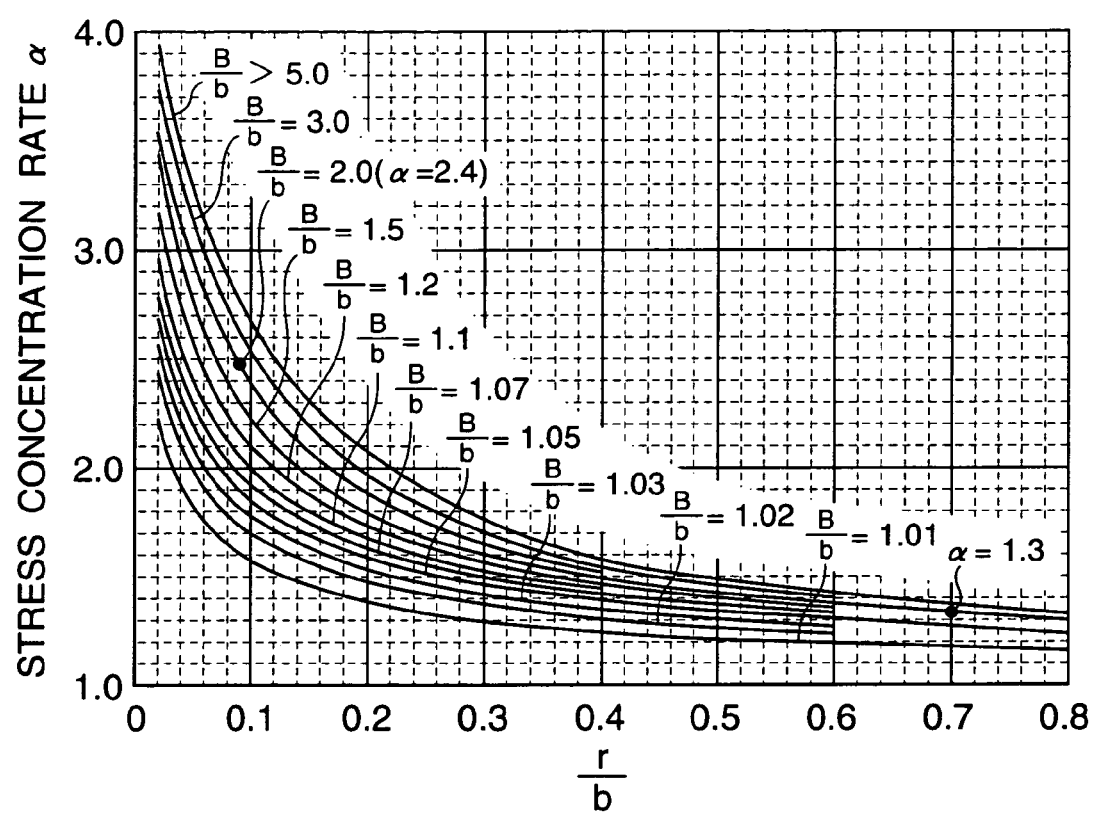
FIG. 8 is a graph showing a generally believed relationship of a construction simply modeling the construction according to the embodiment of the invention, dimensions of respective portions of the construction and stress concentration rate by a corner radius.

FIG. 8 shows a generally believed relationship of a construction simply modeling the construction according to the embodiment of the invention (a construction simply modeling one of stresses that are assumed to be generated in a symmetrical fashion relative to the axial direction X when an external force is applied to one of the pockets in the retainer, dimensions of respective portions of the construction and stress concentration rate $\alpha$ by a corner radius (reference was made to the "Stress Concentration" by Masataka Nishida). In the figure, B denotes a half the width of the pocket in the retainer revolving direction Y and b denotes a half the width of the pillar 2 in the retainer revolving direction Y.

It is seen from the above that when the size of the radius of curvature r of the corner radius is small, the stress concentration rate $\alpha$ increases extremely.

With the corner radii of the pockets of the retainer of conventional type, as described above, it is not possible in any way to increase the radius of curvature as a matter of machining technique. Normally, with the conventional retainer, the radius of curvature is quite small to be r<1 mm, and in particular, there is even a smaller radius of curvature such as r=0.3 mm.

In contrast, with the present example, machining is effected with r=2 mm, and a value of r/b (b is constant) shown in FIG. 5 can be increased to in the order of 7 times the conventional radius of curvature. As a result of this, the stress concentration rate $\alpha$ can be reduced substantially to a half the conventional one (from 2.5 to 1.3). Therefore, the strength can be expected to be improved from the viewpoint of stress concentration by adopting the present invention.

In addition, this serves to increase the number of rolling elements, and hence leads to an increase in load capacity.

In this example, while all the corner radii in the four corners are machined to the same dimensions, according to the machining used in the invention, it is possible to continuously change the radius of curvature from the outside diameter side toward the inside diameter side. Thus, as required, the radius of curvature r may be set to an optimal value such that a ratio of the width b of the pillar 2 that affects the stress concentration rate $\alpha$ to the radius of curvature (r/b) becomes optimal.

As described heretofore, in the retainer according to the invention, even with a machined integral one-piece retainer, there is imposed no limitation to the configuration of the pockets, in other words, the pocket sectional configuration is not limited to the straight configuration but may advantageously be set to any configuration. Moreover, the accuracy at the pillars of the pockets is high, thereby making it possible to provide a stable retainer.

In addition, since any radius of curvature may be imparted to the pocket sectional configuration, it is possible not only to alleviate the contact stress between the rolling elements in the pockets and the retainer but also to improve the lubricating conditions.

In particular, with a retainer for a roller bearing, since the radius of curvature of the respective corner radii in the four corners of the pockets can be set to any radius of curvature, the stress concentration taking place when the bearing is in use can be alleviated.

In the invention, since not only the run-out preventing portion (the engagement portion) but also the edge portions at the respective portions can be machined at the same time as the pocket is machined for finishing, de-burring work can be obviated in the posterior process.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A retainer for rolling bearings comprising:
a rolling element receiving pocket for receiving a rolling element, said pocket being formed by finish-machining a blank pocket with a milling tool member while a machining part of said tool member is inserted into said blank pocket in a radial direction of said retainer and then translated in an axial and revolving directions of said retainer,
wherein said machining part of said tool member has a sectional contour which coincides with a sectional configuration of said pocket in a cross section taken along the radial direction of said retainer after the formation of said pocket is completed,
wherein said rolling element is a roller,
said pocket is defined by a pair of ring-shaped side plates and a pair of pillars each having end portions which are respectively connected to said ring-shaped side plates,
a first pocket surface is formed on each of said pillars and a second pocket surface is formed on each of said ring-shaped side plates, wherein one of said pillars has a chamfer portion provided thereon at a boundary between said one of said pillars and either an outside or inside diameter surface of the retainer,
said first pocket surface is formed in an arc-shaped configuration in a cross section along the radial direction of said retainer,
wherein roller run-out preventing portions are formed at end portions of said pillars in the radial direction of said retainer, the width of said pocket in the revolving direction of the retainer is made smaller than the diameter of said roller, said width being defined between adjacent roller run-out preventing portions and formed at an end thereof in the radial direction of said retainer,
wherein said first pocket surface faces toward the revolving direction of said retainer, and said second pocket surface faces toward the axial direction of said retainer and an escaping recess is disposed between said first and second pocket surfaces,
wherein said tool member comprises a first tool for finish-machining said first pocket surface and a second tool for finish-machining said second pocket surface and said escape recess, and
wherein a surface of the escaping recess is arc-shaped when viewed from the radial direction of the retainer.

2. The retainer for rolling bearings as set forth in claim 1, wherein end portions of said run-out preventing portion in the axial direction of said retainer are separated from one of said side plates by escaping recesses.

3. The retainer for rolling bearings as set forth in claim 1, wherein a length of one of the run out preventing portions is equal to or less than a roller effective length e and is more than 0.75 of the roller effective length e.

4. A retainer for rolling bearings comprising:
a rolling element receiving pocket for receiving a rolling element, said pocket being formed by finish-machining a blank pocket with a milling tool member while a machining part of said tool member is inserted into said blank pocket in a radial direction of said retainer and then translated in an axial and revolving directions of said retainer,
wherein said machining part of said tool member has a sectional contour which coincides with a sectional configuration of said pocket in a cross section taken along the radial direction of said retainer after the formation of said pocket is completed,
wherein said pocket comprises a first pocket surface facing toward the revolving direction of said retainer, a second pocket surface facing toward the axial direction of said retainer and an escaping recess disposed between said first and second pocket surfaces, and wherein said tool member comprises a first tool for finish-machining said first pocket surface and a second tool for finish-machining said second pocket surface and said escaping recess,
wherein said rolling element is a roller,
said pocket is defined by a pair of ring-shaped side plates and a pair of pillars each having end portions which are respectively connected to said ring-shaped side plates,
a first pocket surface is formed on each of said pillars and a second pocket surface is formed on each of said ring-shaped side plates,
said first pocket surface is formed in an arc-shaped configuration in a cross section along the radial direction of said retainer, and
wherein roller run-out preventing portions are formed at end portions of said pillars in the radial direction of said retainer, the width of said pocket in the revolving direction of the retainer is made smaller than the diameter of said roller, said width being defined between adjacent roller run-out preventing portions and formed at an end thereof in the radial direction of said retainer,
wherein a sectional configuration of said run-out preventing portion along the radial direction of the retainer on the pillar side is formed into a curved line smoothly connecting to said first pocket surface and having a radius of curvature protruding toward said pocket, and
wherein a surface of the escaping recess is arc-shaped when viewed from the radial direction of the retainer.

5. The retainer for a rolling bearing as set forth in claim 4, wherein one of said pillars has a chamfer portion provided thereon at a boundary between said one of said pillars and either an outside or inside diameter surface of the retainer.

6. A retainer for a roller bearing comprising:
a pair of ring-shaped side plates;
a plurality of pillars arranged in a retainer revolving direction and each having end portions respectively connected to said ring-shaped side plates, wherein one of said pillars has a chamfer portion provided thereon at a boundary between said one of said pillars and either an outside or inside diameter surface of the retainer, a roller receiving pocket defined by said ring-shaped side plates and adjacent pillars of said pillars for receiving a roller, wherein pocket surfaces are formed on sides of said pillars and side plates by machining with a milling tool member, recesses of said pocket are formed at portions where said pillars and said side plates are joined to each other, at least a portion of said pocket surface formed on the side of said pillar with which said roller is brought into contact is formed in an arc-shaped configuration in a cross section along a retainer radial direction, wherein a minimum plate width of each of said side plates at said recesses is made uniform along the retainer radial direction, wherein a roller run out preventing portion is provided at an end portion of said pillars, and wherein a surface of said recesses is arc-shaped when viewed from the radial direction of the retainer.

7. The retainer for a rolling bearing as set forth in claim 6, wherein a length of one of said roller run out preventing portions is equal to or less than a roller effective length e and is more than 0.75 of the roller effective length e.

8. A retainer for a roller bearing comprising:

a pair of ring-shaped side plates;

a plurality of pillars arranged in a retainer revolving direction and each having end portions respectively connected to said ring-shaped side plates, wherein one of said pillars has a chamfer portion provided thereon at a boundary between said one of said pillars and either an outside or inside diameter surface of the retainer;

a roller receiving pocket defined by said ring-shaped side plates and adjacent pillars of said pillars for receiving a roller, wherein pocket surfaces are formed on sides of said pillars and said side plates by machining with a milling tool member, recesses of said pocket are formed at portions where said pillars and said side plates are joined to each other, and at least a portion of said pocket surface formed on the side of said pillar with which said roller is brought into contact is formed into an arc-shaped configuration in a cross section along a retainer radial direction, wherein roller run-out preventing portions are formed at end portions of said pillars in the retainer radial direction, the width of said pocket in a retainer revolving direction which is defined between adjacent roller run-out preventing portions and formed at an end thereof in the retainer radial direction is made smaller than the diameter of said roller, and end portions of each of said run-out preventing portion in a retainer axial direction are separated from said side plates by said recesses, and wherein a surface of said recesses is arc-shaped when viewed from the radial direction of the retainer.

9. The retainer for a rolling bearing as set forth in claim 6, wherein a length of one of said roller run out preventing portions is equal to or less than a roller effective length e and is more than 0.75 of the roller effective length e.

10. A retainer for a roller bearing comprising:

a pair of ring-shaped side plates;

a plurality of pillars arranged in a retainer revolving direction and each having end portions respectively connected to said ring-shaped side plates;

a roller receiving pocket defined by said ring-shaped side plates and adjacent pillars of said pillars for receiving a roller, wherein pocket surfaces are formed on sides of said pillars and said side plates by machining with a milling tool member, recesses of said pocket are formed at portions where said pillars and said side plates are joined to each other, at least a portion of said pocket surface formed on the side of said pillar with which said roller is brought into contact is formed into an arc-shaped configuration in a cross section along a retainer radial direction, a roller run-out preventing portion is formed at an end portion of said pillar in the retainer radial direction, the width of said pocket in a retainer revolving direction which is defined by adjacent roller run-out preventing portions and formed at an end thereof in the retainer radial direction is made smaller than the diameter of said roller, and a sectional configuration of said run-out preventing portion along the retainer radial direction on the pillar side is formed into a curved line smoothly connecting to said arc-shaped configuration of said pocket surface formed on the side of said pillar and having a radius of curvature protruding toward said pocket, and wherein a surface of the recess is arc-shaped when viewed from the radial direction of the retainer.

11. The retainer for a rolling bearing as set forth in claim 10, wherein a length of one of said roller run out preventing portions is equal to or less than a roller effective length e and is more than 0.75 of the roller effective length e.

12. The retainer for a rolling bearing as set forth in claim 10, wherein one of said pillars has a chamfer portion provided thereon at a boundary between said one of said pillars and either an outside or inside diameter surface of the retainer.

* * * * *